(12) United States Patent
Hirayama

(10) Patent No.: US 7,221,480 B2
(45) Date of Patent: May 22, 2007

(54) IMAGE PROCESSING APPARATUS AND IMAGE FORMING APPARATUS

(75) Inventor: Masatsugu Hirayama, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 262 days.

(21) Appl. No.: 10/944,897

(22) Filed: Sep. 21, 2004

(65) Prior Publication Data

US 2005/0041267 A1 Feb. 24, 2005

Related U.S. Application Data

(63) Continuation of application No. 09/717,233, filed on Nov. 22, 2000, now Pat. No. 6,920,245.

(51) Int. Cl.
*G06K 15/00* (2006.01)
*H04N 1/46* (2006.01)

(52) U.S. Cl. .................. 358/1.9; 358/2.1; 358/500

(58) Field of Classification Search ............... 358/448, 358/443, 474, 1.6, 1.9, 2.1, 3.1, 500, 1.5, 358/530, 538; 382/169, 176
See application file for complete search history.

(56) References Cited

U.S. PATENT DOCUMENTS 6,204,873 B1 * 3/2001 Shimazaki ................ 347/172

6,567,544 B1   5/2003 Kanno et al.
6,631,209 B1   10/2003 Kanamori

FOREIGN PATENT DOCUMENTS

JP   11-187266 A   7/1999
JP   2000-83166 A   3/2000

* cited by examiner

*Primary Examiner*—Jerome Grant, II
(74) *Attorney, Agent, or Firm*—Foley & Lardner LLP

(57) ABSTRACT

A color conversion section converts R-, G- and B-image signals input by the reading of a color image on an original to C-, M- and Y-color signals. A histogram producing means of an image processing section produces density histograms of the respective color signals on the basis of the converted C-, M- and Y-color signals. An original type determination means determines a type of the original on the basis of the histogram data signals. A colored background determination means determines a colored background on the basis of the histogram data signals. A background process presence/absence determination means determines whether a background process is to be executed or not, on the basis of an original type determination result signal and a colored background determination result signal. A CPU produces, when it is determined that the background process is to be executed, a background process table using the density histogram values of the respective color signals. A density adjustment means performs density adjustment of the respective color signals input from the color conversion section, on the basis of the background process table.

11 Claims, 5 Drawing Sheets

IMAGE PROCESSING APPARATUS AND IMAGE FORMING APPARATUS

The present application is a continuation of U.S. application Ser. No. 09/717,233, filed Nov. 22, 2000 now U.S. Pat. No. 6,920,245, the entire contents of which are incorporated herein by reference.

BACKGROUND OF THE INVENTION

The present invention relates to an image processing apparatus for processing a color image read from an original, for example, in an image forming apparatus such as a digital color copying machine for forming a copy image of a color image, and also to an image forming apparatus such as a digital color copying machine using this image processing apparatus.

Generally speaking, there are various types of originals to be copied, and it is not necessarily ideal to reproduce an image of an original with high fidelity, depending on the purpose of use of the reproduced image. For example, in the case of an original such as newspaper or a notebook, on which the density of a background image is high, if the background image with high density is reproduced with high fidelity, the contrast of character image portions lowers and the copied image becomes very difficult to read.

Besides, where there are images on both sides of a thin paper sheet such as a paper sheet of a magazine, the image on the back side of the sheet is seen through. In such a case, if the image on the front side is copied, the image on the back side is copied together, and a phenomenon called "back-side copying" occurs.

Accordingly, where newspaper, a notebook or a magazine is to be copied, the density of copying is manually adjusted in normal cases so as to reduce the background image or the possibility of back-side copying.

Jpn. Pat. Appln. KOKAI Publication No. 2000-83166, for instance, discloses that a histogram is produced from input image data to calculate white and black reference values, and the density of the input image data is adjusted based on the white and black reference values, whereby the background image is eliminated or the density of thin character images is increased.

In addition, Jpn. Pat. Appln. KOKAI Publication No. 11-187266 discloses that a background density level is calculated from input R-, G- and B-image data, and a density conversion table is prepared based on the background density level, whereby the density of the input image data is converted. Thereby, the background density adjustment, including elimination of background, is performed so that character images may not become difficult to read even if the background density is decreased.

In the case of color copying, however, a background image on an original, if it has a special significance (e.g. a map), should be left as such. In the case of such a colored background image, it is very difficult to determine whether the background image should be left or not.

In the above-mentioned Jpn. Pat. Appln. KOKAI Publication No. 11-187266, the density conversion table is prepared from the R-, G- and B-image data to adjust the density. In normal cases, in an image forming apparatus such as a digital color copying machine, color-separated images of respective color components, which are obtained by a conventional subtractive color mixing method, i.e. four color image signals of yellow (Y), magenta (M), cyan (C) and black (K), are used for image formation. In the case of color copying, high-quality ground processing cannot be performed on the basis of R-, G- and B-image data.

In the case of an original including a photograph, if elimination of background or back-side copying is effected for the entire image, the density of the photograph, which requires high-fidelity density reproduction, lowers. It is necessary, in particular, to prevent the photograph area from being subjected to the process for elimination of background or back-side copying. It is thus very difficult to determine whether the background processing should be carried out or not, depending on the type of an original, e.g. depending on whether an original includes a character or a photograph.

BRIEF SUMMARY OF THE INVENTION

The object of the present invention is to provide an image processing apparatus and an image forming apparatus capable of performing image processing by properly determining whether or not a background process is to be performed, depending on whether an original has a color image or a monochromatic image and whether an original includes a character or a photograph.

According to the present invention, there is provided an image processing apparatus for processing a plurality of color image signals input by reading of a color image on an original, the apparatus comprising: conversion means for converting said plurality of color image signals to a plurality of color signals; first producing means for producing density distributions of plural color signals on the basis of the plurality of color signals converted by the conversion means; discrimination means for discriminating a type of the original on the basis of the density distributions of the plural color signals produced by the first producing means; first determination means for determining a colored background on the basis of the density distributions of the plural color signals produced by the first producing means; second determination means for determining whether a background process is to be executed or not, on the basis of a determination result of the first determination means and a discrimination result of the discrimination means; second producing means for producing, when the second determination means has determined that the background process is to be executed, a background process table using the density distribution values of the plural color signals produced by the first producing means; and density adjustment means for performing density adjustment of the plural color signals input from the conversion means, on the basis of the background process table produced by the second producing means.

According to this invention, there is also provided an image processing apparatus for processing a plurality of color image signals input by reading of a color image on an original, the apparatus comprising: conversion means for converting said plurality of color image signals to a plurality of color signals; first producing means for producing density distributions of plural color signals on the basis of the plurality of color signals converted by the conversion means; discrimination means for discriminating a type of the original on the basis of the density distributions of the plural color signals produced by the first producing means; first determination means for determining a colored background on the basis of the density distributions of the plural color signals produced by the first producing means; second determination means for determining whether a background process is to be executed or not, on the basis of a determination result of the first determination means and a discrimination result of the discrimination means; second producing means for producing, when the second determination means has determined that the background process is to be executed, a background process table using the density distribution values of the plural color signals produced by the first producing means, and synthesizing the produced background process table and a prestored density adjustment table, thereby producing a new density adjustment table; and density adjustment means for performing density adjustment of the plural color signals input from the conversion means, on the basis of the new density adjustment table produced by the second producing means.

According to this invention, there is also provided an image forming apparatus comprising: image reading means for reading a color image on an original and outputting a plurality of image signals; conversion means for converting the plural color image signals output from the image reading means to a plurality of color signals; first producing means for producing density distributions of plural color signals on the basis of the plurality of color signals converted by the conversion means; discrimination means for discriminating a type of the original on the basis of the density distributions of the plural color signals produced by the first producing means; first determination means for determining a colored background on the basis of the density distributions of the plural color signals produced by the first producing means; second determination means for determining whether a background process is to be executed or not, on the basis of a determination result of the first determination means and a discrimination result of the discrimination means; second producing means for producing, when the second determination means has determined that the background process is to be executed, a background process table using the density distribution values of the plural color signals produced by the first producing means; density adjustment means for performing density adjustment of the plural color signals input from the conversion means, on the basis of the background process table produced by the second producing means; and image forming means for forming an image on the basis of the plural color signals obtained from the density adjustment means.

DETAILED DESCRIPTION OF THE INVENTION

An embodiment of the present invention will now be described with reference to the accompanying drawings.

Figure 1:
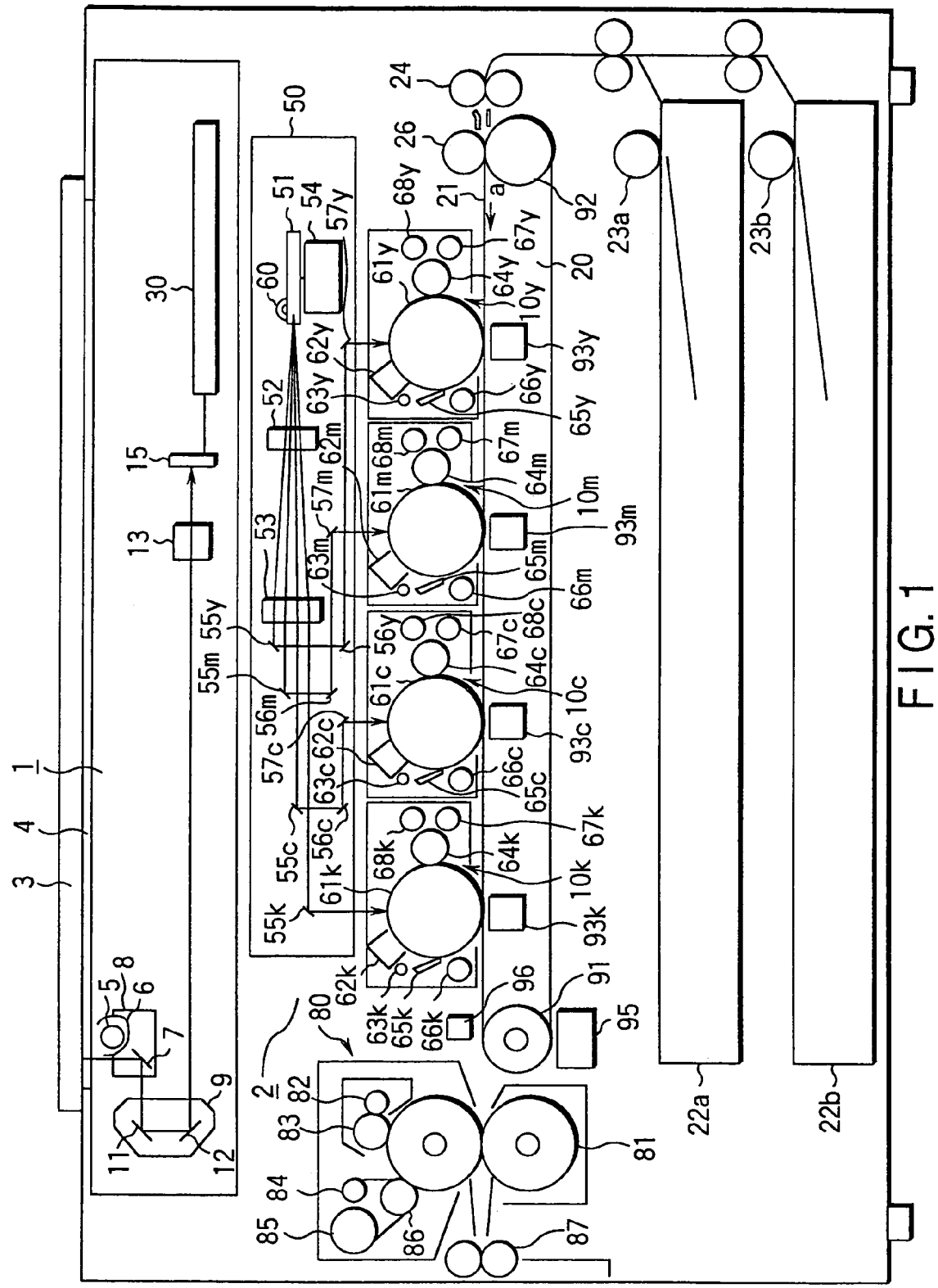
FIG. 1 is a view schematically showing an internal structure of a color image forming apparatus such as a digital color copying machine for forming a copy image of a color image according to an embodiment of the present invention.

FIG. 1 schematically shows an internal structure of a color image forming apparatus according to the present invention, such as a digital color copying machine, for forming a copy image of a color image. In general terms, the color image forming apparatus comprises a color scanner section 1 serving as image reading means for reading a color image on an original, and a color printer section 2 serving as image forming means for forming a copy image of the read color image.

The color scanner section 1 has an original table cover 3 on its upper part, and an original table 4 formed of transparent glass and disposed to face the original table cover 3 in the closed state. An original is placed on the original table 4. Below the original table 4, there are provided an exposure lamp 5 for illuminating the original placed on the original table 4; a reflector 6 for converging light from the exposure lamp 5 onto the original; and a first mirror 7 for deflecting the reflection light from the original to the left in the figure. The exposure lamp 5, reflector 6 and first mirror 7 are fixed to a first carriage 8. The first carriage 8 is driven by a pulse motor (not shown) by means of a toothed belt (not shown), etc. so that the first carriage 8 may be moved in parallel along the lower surface of the original table 4.

A second carriage 9 is disposed on the left side (in the figure) of the first carriage 8, that is, on the side to which reflection light from the first mirror 7 is guided. The second carriage 9 is movable in parallel to the original table 4 by means of a drive mechanism (not shown) (e.g. a toothed belt and a DC motor). The second carriage 9 comprises a second mirror 11 for downwardly (in the figure) deflecting the reflection light from the original which has been guided by the first mirror 7, and a third mirror 12 for deflecting the reflection light from the second mirror 11 to the right in the figure. The second mirror 11 and third mirror 12 are disposed at right angles to each other. The second carriage 9 follows the movement of the first carriage 8 and moves in parallel to the original table 4 at a speed equal to half the speed of the first carriage 8.

A focusing lens 13 for focusing the reflection light from the third mirror 12 at a predetermined magnification is disposed in a plane including an optical axis of the light deflected by the second and third mirrors 11 and 12. A CCD color image sensor (photoelectric conversion element) 15 for converting the reflection light converged by the focusing lens 13 to an electric signal is disposed in a plane substantially perpendicular to the optical axis of the light traveling through the focusing lens 13.

If light from the exposure lamp 5 is converged onto the original placed on the original table 4 by means of the reflector 6, the reflection light from the original is made incident on the color image sensor 15 via the first mirror 7, second mirror 11, third mirror 12 and focusing lens 13. The color image sensor 15 converts the incident light to electric signals of the three primary colors, R (red), G (green) and B (blue).

The color printer section 2 has first to fourth image forming units 10$y$, 10$m$, 10$c$ and 10$k$ for producing color-separated images of respective color components, that is, images of four colors, yellow (Y), magenta (M), cyan (C) and black (K), which are color-separated according to a well-known subtractive color mixing process.

A convey mechanism 20 is disposed below the image forming units 10$y$, 10$m$, 10$c$ and 10$k$. The convey mechanism 20 includes a convey belt 21 serving as convey means for conveying color images produced by the respective image forming units in a direction indicated by an arrow a. The convey belt 21 is passed between a driving roller 91 rotated by a motor (not shown) in the direction of arrow a and a driven roller 92 disposed apart from the driving roller 91 by a predetermined distance. The convey belt 21 is endlessly run in the direction of arrow a at a fixed speed. The image forming units 10y, 10m, 10c and 10k are arranged in tandem in the direction of conveyance of the convey belt 21.

Each of the image forming unit 10y, 10m, 10c and 10k includes a photosensitive drum 61y, 61m, 61c, 10k serving as an image carrying body. The photosensitive drums 61y, 61m, 61c and 61k have outer peripheral surfaces which are rotatable in the same direction at points of contact with the convey belt 21. The photosensitive drums 61y, 61m, 61c and 61k are rotated by a motor (not shown) at a predetermined speed.

The photosensitive drums 61y, 61m, 61c and 61k are disposed to have their axes arranged at regular intervals from one another and in a direction perpendicular to the direction in which images are conveyed by the convey belt 21. In the description below, assume that the axial direction of each photosensitive drum 61y, 61m, 61c, 61k is referred to as a main scan direction (second direction), and the rotational direction of each photosensitive drum 61y, 61m, 61c, 61k, that is, the direction of running of the convey belt 21 (the direction of arrow a), is referred to as a sub-scan direction (first direction).

Around each of the photosensitive drum 61y, 61m, 61c and 61k, the following elements are disposed in order in the rotational direction: a charging device 62y, 62m, 62c, 62k serving as charging means, extended in the main scan direction; a destaticizer 63y, 63m, 63c, 63k; a developing roller 64y, 64m, 64c, 64k serving as developing means, similarly extended in the main scan direction; a lower stirring roller 67y, 67m, 67c, 67k; an upper stirring roller 68y, 68m, 68c, 68k; a transfer device 93y, 93m, 93c, 93k serving as transfer means, similarly extended in the main scan direction; a cleaning blade 65y, 65m, 65c, 65k similarly extended in the main scan direction; and a waste toner recovering screw 66y, 66m, 66c, 66k.

Each transfer device 93y, 93m, 93c, 93k is disposed at such a position as to sandwich the convey belt 21 between itself and the photosensitive drum 61y, 61m, 61c, 61k, that is, inside the convey belt 21. In addition, an exposure point by an exposure device 50 (to be described later) is formed on that portion of the outer peripheral surface of each photosensitive drum 61y, 61m, 61c, 61k, which lies between the charging device 62y, 62m, 62c, 62k and the developing roller 64y, 64m, 64c, 64k.

Sheet cassettes 22a, 22b containing paper sheets P as image formation media, on which images formed by the image forming units 10y, 10m, 10c, 10k are to be transferred, are disposed below the convey mechanism 20.

A pick-up roller 23a, 23b is disposed at one end of each of the sheet cassettes 22a, 22b and on a side close to the driven roller 92. The pick-up roller 23a, 23b picks up sheets P one by one from the uppermost one from the sheet cassette 22a, 22b. Register rollers 24 are disposed between the pickup rollers 23a, 23b and the driven roller 92. The register rollers 24 register and align a leading edge of the sheet P picked up from the sheet cassette 22a, 22b with a leading edge of a y-toner image formed on the photosensitive drum 61y of the image forming unit 10y.

Toner images formed on the other photosensitive drums 61m, 61c and 61k are brought to respective transfer positions in accordance with the transfer timing of the sheet P conveyed on the convey belt 21.

An attraction roller 26 for providing an electrostatic attraction force to the sheet P conveyed at the predetermined timing via the register rollers 24 is disposed between the register rollers 24 and the first image forming unit 10y, and near the driven roller 92, that is, substantially over the outer peripheral surface of the driven roller 92 with the convey belt 21 interposed. The axis of the attraction roller 26 and the axis of the driven roller 92 are set to be parallel to each other.

A position error sensor 96 for sensing a position of the image formed on the sheet P on the convey belt 21 is disposed in a region at one end of the convey belt 21, and near the driving roller 91, that is, substantially over the outer peripheral surface of the driving roller 91 with the convey belt 21 interposed. The position error sensor 96 comprises, for example, a light transmission type or a light reflection type optical sensor.

A convey belt cleaning device 95 for removing toner adhering to the convey belt 21 or paper dust of the sheet P is disposed at the outer peripheral surface of the driving roller 91, in contact with the convey belt 21 on the downstream side of the position error sensor 96.

A fixing device 80 is disposed in a region to which the sheet P conveyed by the convey belt 21 and separated from the driving roller 91 is delivered. The fixing device 80 heats the sheet P at a predetermined temperature, melts the toner image transferred on the sheet P, and fixes the toner image on the sheet P. The fixing device 80 comprises a heat roller pair 81, oil apply rollers 82 and 83, a web winding roller 84, a web roller 85, and a web press roller 86. The toner on the sheet P is fixed and the sheet P with the fixed toner image is discharged by a discharge roller pair 87.

The exposure device 50 forms color-separated electrostatic latent images on outer peripheral surfaces of the respective photosensitive drums 61y, 61m, 61c and 61k. The exposure device 50 has a semiconductor laser 60. The light emission from the semiconductor laser 60 is controlled on the basis of image data (y, m, c, k) of respective colors separated by an image processing unit 63 (to be described below). A polygon mirror 51 rotated by a polygon motor 54 to reflect and scan laser beams and fθ lenses 52 and 53 for focusing the laser beams reflected by the polygon mirror 51 by correcting their focal points are disposed in the named order along the optical path of the semiconductor laser 60.

First deflection mirrors 55y, 55m, 55c and 55k for deflecting the respective color laser beams emanating from the fθ lens 53 toward the exposure points on the photosensitive drums 61y, 61m, 61c and 61k, and second and third deflection mirrors 56y, 56m, 56c, 57y, 57m and 57c for further deflecting the laser beams deflected by the first deflection mirrors 55y, 55m and 55c are disposed between the fθ lens 53 and the photosensitive drums 61y, 61m, 61c and 61k.

The laser beam for black is deflected by the first deflection mirror 55k and then directly guided to the photosensitive drum 61k without intervention of other mirrors.

Figure 2:
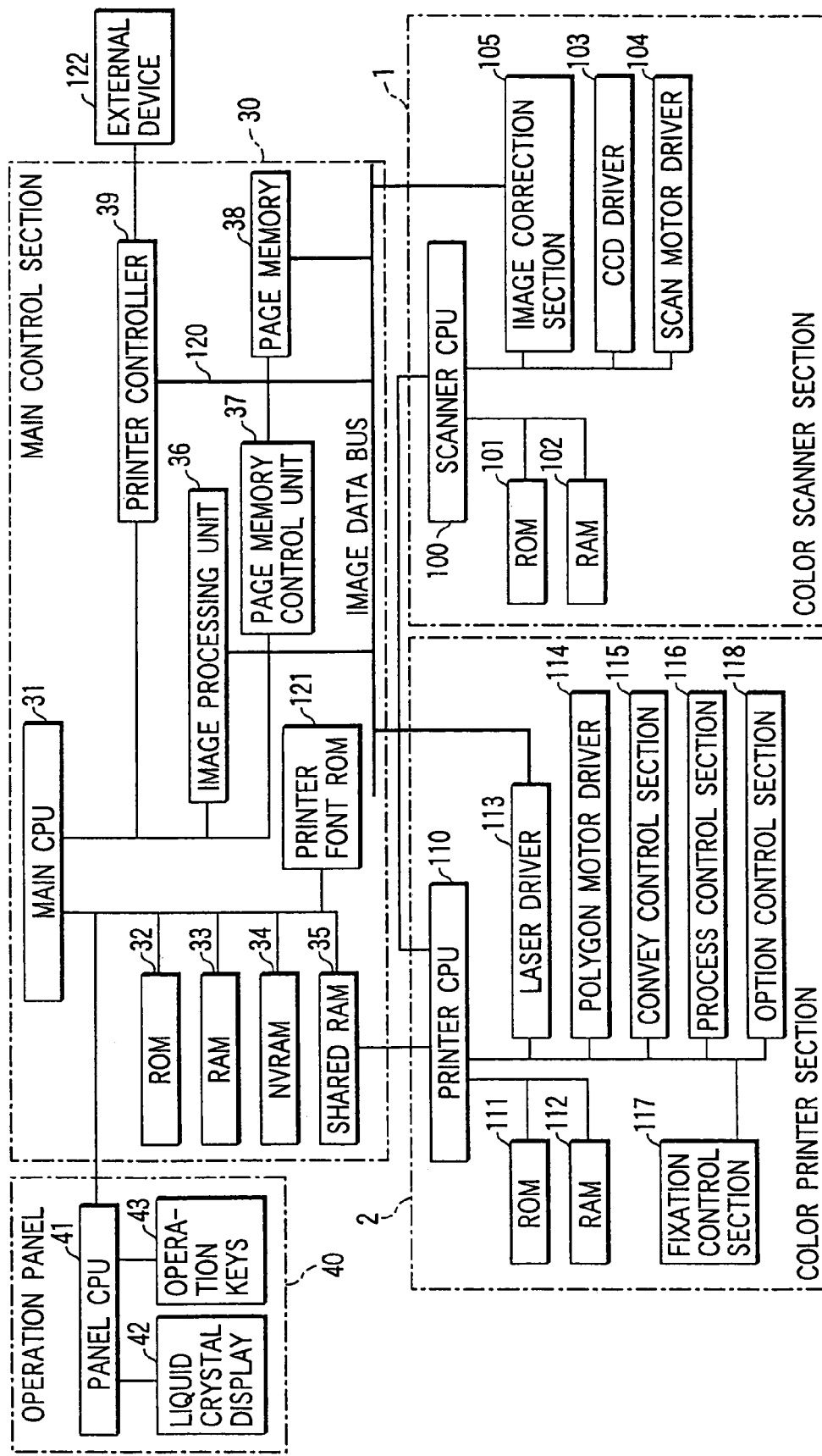
FIG. 2 is a block diagram schematically showing electrical connection of the image forming apparatus shown in FIG. 1 and flow of signals for control.

FIG. 2 is a block diagram schematically showing electrical connection of the digital copying machine shown in FIG. 1 and flow of signals for control. In FIG. 2, a control system comprises three CPUs (Central Processing Units): a main CPU 31 provided in a main control section 30; a scanner CPU 100 in the color scanner section 1; and a color printer CPU 110 in the color printer section 2.

The main CPU 31 performs bi-directional communication with the printer CPU 110 via a shared RAM (Random Access Memory) 35. The main CPU 31 issues an operational instruction, and the printer CPU 110 returns status data. Serial communication is performed between the printer CPU 110 and scanner CPU 100. The printer CPU 110 issues an operational instruction, and the scanner CPU 100 returns status data.

An operation panel 40 comprises a liquid crystal display 42, various operation keys 43 and a panel CPU 41 to which these are connected. The operation panel 40 is connected to the main CPU 31.

The main control section 30 comprises the main CPU 31, a ROM (Read-Only Memory) 32, a RAM 33, an NVRAM 34, shared RAM 35, image processing unit (apparatus) 36, a page memory control unit 37, a page memory 38, a printer controller 39, and a printer font ROM 121.

The main CPU 31 controls the entirety of the main control section 30. The ROM 32 stores control programs, etc. The RAM 33 temporarily stores data.

The NVRAM (Non-Volatile RAM) 34 is a non-volatile memory backed up by a battery (not shown), and even when power is not supplied, stored data is maintained.

The shared RAM 35 is used to perform bi-directional communication between the main CPU 31 and printer CPU 110.

The page memory control unit 37 stores and read out image information in and from the page memory 38. The page memory 38 has areas capable of storing image information of a plurality of pages. The page memory 38 can store compressed data in units of a page, which is obtained by compressing image information from the color scanner section 1.

The printer font ROM 121 stores font data corresponding to print data. The printer controller 39 develops print data, which is sent from an external device 122 such as a personal computer, into image data using the font data stored in the printer font ROM 121 with a resolution corresponding to resolution data added to the print data.

The color scanner section 1 comprises the scanner CPU 100 for controlling the entirety of the color scanner section 1; a ROM 101 storing control programs, etc.; a data storage RAM 102; a CCD driver 103 for driving the color image sensor 15; a scan motor driver 104 for controlling the rotation of a scan motor for moving the first carriage 8, etc.; and an image correction section 105.

The image correction section 105 comprises an A/D converter for converting R-, G- and B-analog signals output from the color image sensor 15 to digital signals; a shading correction circuit for correcting a variance in the color image sensor 15 or a variation in threshold level due to ambient temperature variation relative to the output signal from the color image sensor 15; and a line memory for temporarily storing shading-corrected digital signals from the shading correction circuit.

The color printer section 2 comprises the printer CPU 110 for controlling the entirety of the color printer section 2; a ROM 111 storing control programs, etc.; a data storage RAM 112; a laser driver 113 for driving the semiconductor laser 60; a polygon motor driver 114 for driving the polygon motor 54 of the exposure device 50; a convey control section 115 for controlling conveyance of the sheet P by the convey mechanism 20; a process control section 116 for controlling charging, developing and transferring processes using the charging device, developing roller and transfer device; a fixation control section 117 for controlling the fixing device 80; and an option control section 118 for control options.

The image processing unit 36, page memory 38, printer controller 39, image correction section 105 and laser driver 113 are connected over an image data bus 120.

Figure 3:
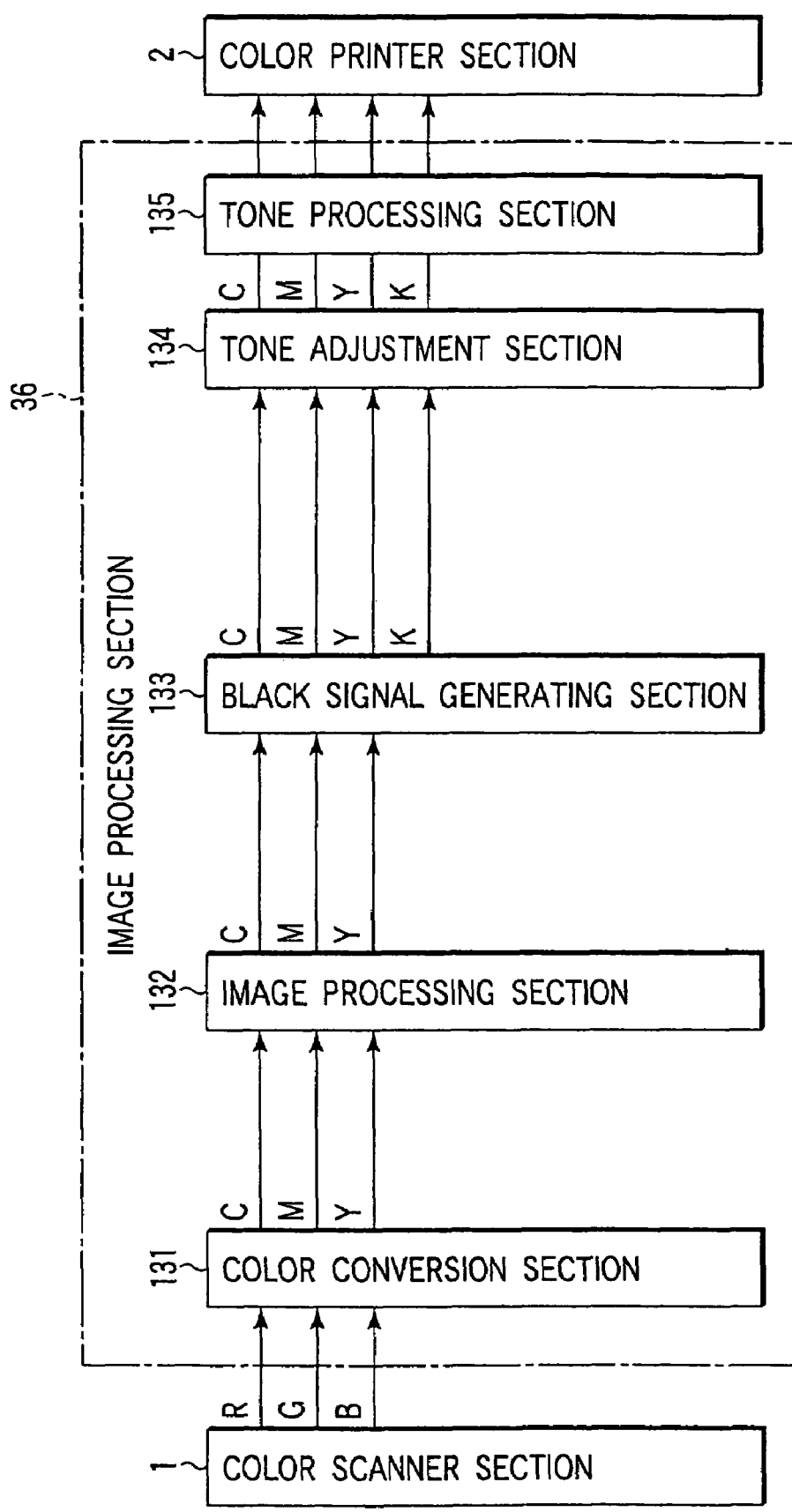
FIG. 3 is a block diagram schematically showing the structure of an image processing unit.

FIG. 3 schematically shows the structure of the image processing unit 36. In FIG. 3, image data R (red), G (green), B (blue) output from the color scanner section 1 is sent respectively to a color conversion section 131 in the image processing unit 36. The color conversion section 131 converts the input image data R, G, B to color signals of C (cyan), M (magenta) and Y (yellow). The color signals C, M and Y from the color conversion section 131 are sent to an image processing section 132. The image processing section 132 subjects the input color signals C, M and Y to various processings. Color signals C, M and Y output from the image processing section 132 are delivered respectively to a black signal generating section 133.

The black signal generating section 133 generates a signal of K (black) on the basis of the input color signals C, M and Y. Where color printing is effected, if three inks of C, M and Y are used, gray close to black is produced. In order to exactly print a black area as black pixels, the signal (K) for the black portion is produced. The signals of C, M, Y and K output from the black signal generating section 133 are sent to a tone adjustment section 134.

The tone adjustment section 134 corrects the input signals of C, M, Y and K. The tone-adjusted signals C, M, Y and K output from the tone adjustment section 134 are delivered to a tone processing section 135. The tone processing section 135 subjects the input signals C, M, Y and K to, for instance, an error spread method, in accordance with the number of recordable bits of the color printer section 2. Signals C, M, Y and K output from the tone processing section 135 are delivered to the color printer section 2.

Figure 4:
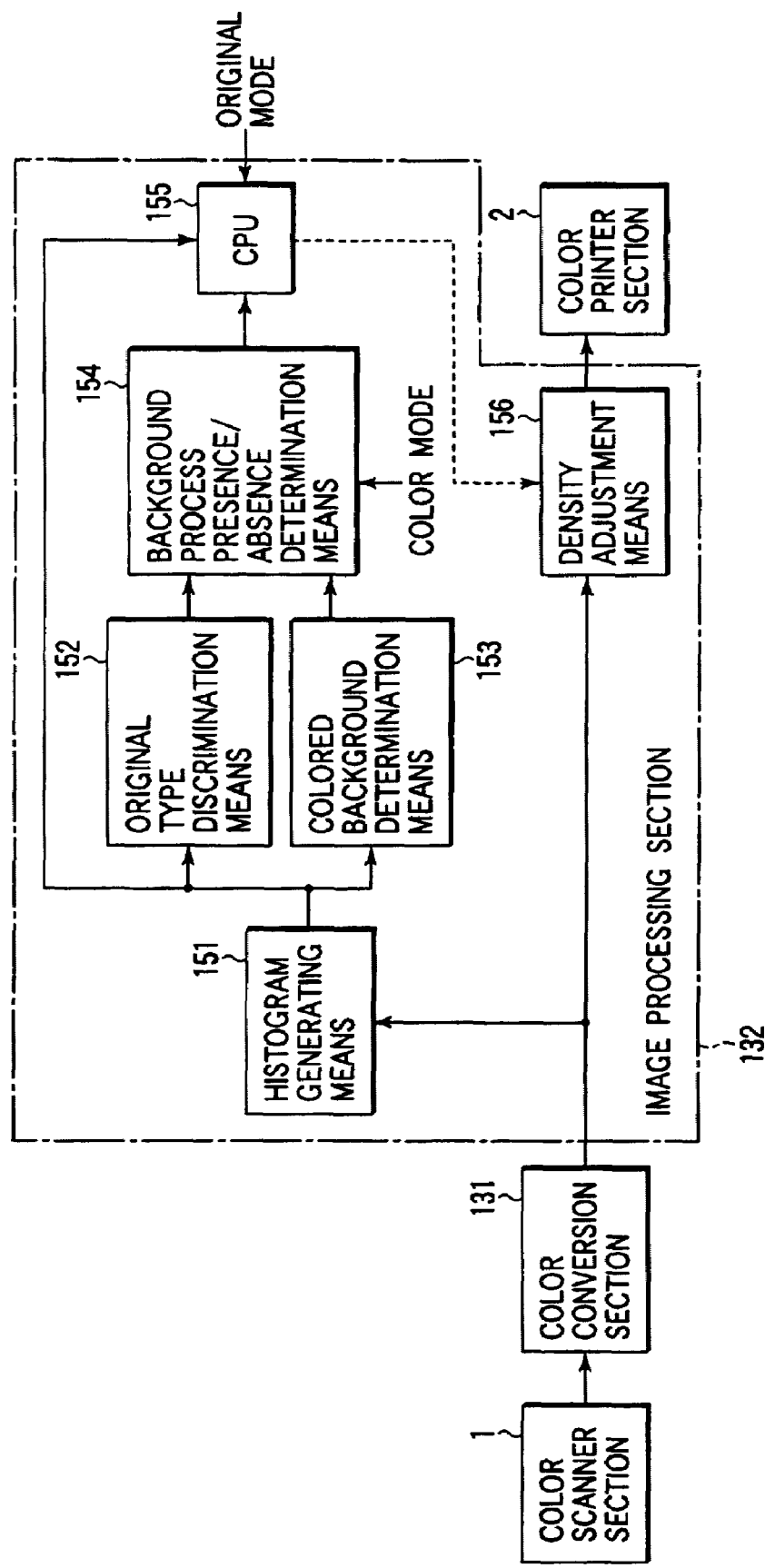
FIG. 4 is a block diagram schematically showing the structure of a main part of the image processing unit.

FIG. 4 schematically shows the structure of a main part of the image processing unit 36. For the purpose of simpler description, FIG. 4 omits showing of the structural elements of the image processing unit 36, except the color conversion section 131 and image processing section 132 according to the invention.

Referring to FIG. 4, pre-scan color image data R, G, B output from the color scanner section 1 is sent to the color conversion section 131. The color conversion section 131 converts the received data to color signals C, M and Y. The color signals C, M and Y are delivered to both histogram generating means 151 and density adjustment means 156 of the image processing section 132.

The histogram generating means 151 generates density histograms from the input color signals C, M and Y, and delivers the corresponding histogram data signals to original type discrimination means 152, colored background determination means 153 and a CPU 155.

The original type discrimination means 152 discriminates, based on the histogram data signals, whether the input original is a character original or a photograph original. The original type discrimination means 152 sends an original type discrimination result signal to background process presence/absence determination means 154.

The colored background determination means 153 determines, based on the histogram data signals, whether the input original has a colored background, and delivers a colored background determination result signal to the background process presence/absence determination means 154.

The background process presence/absence determination means 154 determines whether a background process is to be performed or not, on the basis of the delivered original type discrimination result signal and colored background determination result signal.

In accordance with a determination result from the background process presence/absence determination means 154, the CPU 155 effects switching between a density adjustment table and a background process table (to be described later in detail) which is to be set in the density adjustment means 156.

The density adjustment means 156 adjusts the density of each of input color signals C, M and Y produced by main scan from the color conversion section 131, on the basis of the density adjustment table or background process table set by the CPU 155.

A description will now be given of the density adjustment table and background process table.

The CPU 155 stores density adjustment tables (density adjustment curves) corresponding to original modes which can be set through the operation panel 40 at the time of pre-scan and main scan of the original. The original modes include, for instance, "character", "character/photograph", "photographic paper", "print", and "map". For example, when the "character" original mode is set, the CPU 155 sets the density adjustment table for the original including character portions in the density adjustment means 156. Alternatively, when the "character/photograph" original mode is set, the CPU 155 sets the density adjustment table for the original including character portions and photograph portions in the density adjustment means 156.

Where the background process presence/absence determination means 154 has determined that the background process is to be executed, the CPU 155 sets the background process table prepared using the histogram data signals (to be described later) in the density adjustment means 156, in place of the above-mentioned density adjustment table.

The CPU 155 may synthesize the prepared background process table and the density adjustment table selected according to the original mode. In this case, more precise density adjustment can be effected.

The density adjustment means 156 performs density adjustment of the color signals C, M and Y on the basis of the set density adjustment table or background process table. The density adjustment means 156 adjusts the density of each of the color signals C, M and Y, which are input using a RAM of, e.g. 8 bit×256=256 bytes (256×3 bytes in the case of color signals C, M and Y), and outputs a density adjustment signal of each color signal.

The outline of the operations of the image processing according to the present invention with the above-described structure will now be described.

In the image processing section 132, the processing in the histogram generating means 151, original type discrimination means 152, colored background determination means 153 and background process presence/absence determination means 154 is carried out using the color signals C, M and Y obtained by pre-scan. Based on the determination result of the background process presence/absence determination means 154, the CPU 155 controls switching between the density adjustment table and background process table which is to be set in the density adjustment means 156.

Where the background process is present, the CPU 155 generates the background process table and sets it in the density adjustment means 156. Where the background process is absent, the CPU 155 sets in the density adjustment means 156 the pre-stored density adjustment table corresponding to the original mode.

Based on the set background process table or density adjustment table, the density adjustment means 156 performs density adjustment of each of the color signals C, M and Y input by main scan and outputs density adjustment signals to the color printer section 2.

The operations of the image processing according to the present invention will now be described more specifically.

To start with, R-, G- and B-image signals (of 8 bits each) obtained by pre-scan of the color scanner section 1 are converted to color signals C, M and Y (of 8 bits each) by the color conversion section 131. The color signals C, M and Y are sent to the histogram generating means 151 of the image processing section 132.

The histogram generating means 151 generates histograms by counting pixels associated with the densities of colors of the input color signals C, M and Y. The density histograms are prepared for the respective color signals C, M and Y. In each density histogram, the abscissa indicates the density, and the ordinate indicates the count number of pixels.

The original type discrimination means 152 and colored background determination means 153 perform the original type discrimination and colored background determination, respectively, on the basis of histogram data signals corresponding to the generated density histograms of the color signals C, M and Y.

Figure 5:
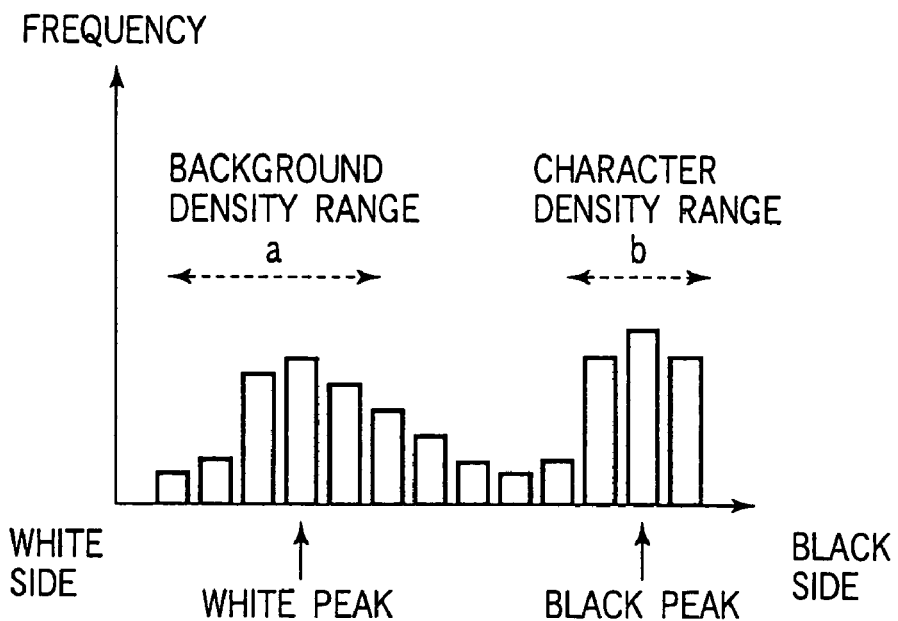
FIG. 5 is a view for explaining a white peak and a black peak in a density histogram.

FIG. 5 shows an example of the density histogram generated by the original type discrimination means 152 on the basis of each of the color signals C, M and Y. In FIG. 5, assume that a peak in a density range, which is considered to be associated with a background portion, is a white peak, and a peak in a density range, which is considered to be associated with a character portion, is a black peak.

The original type discrimination means 152 determines that the original is a character original if all the color signals C, M and Y are determined to be associated with the character original with respect to the following three conditions. Otherwise, the original is determined to be a photograph original.

(1a) White Width

Discrimination is made based on the dimension of the white peak in the width direction in the density histogram. In the case of a character original, the width of an area with a high frequency of the white peak is narrow. In this case, accordingly, the character original is determined. Specifically, the character original is determined if the total frequency in the specified width range on both sides of the white peak (e.g. a background density range a in FIG. 5) is a threshold $T_1$ or more.

(2a) Character Frequency

If the sum of frequencies near the white peak and black peak is large, the character original is determined. Specifically, the frequency in the specified width range of the white peak and the frequency in the specified width range of the black peak (e.g. the background density range a and character density range b in FIG. 5) are added, and if the added value is a threshold $T_2$ or more relative to the total histogram, the character original is determined.

(3a) White Background

If an original has a portion with a frequency distribution concentrated on the low density side of the white peak position, such a portion is considered to be a half-tone portion of a photograph original. Thus, the photograph original is determined. Specifically, if the histogram in the specified width range (e.g. the background density range a in FIG. 5) on the low density side of the white peak is a threshold $T_3$ or more relative to the total histogram, the photograph original is determined.

The colored background determination means 153 performs the colored background determination in order to determine whether a colored background should be left as such in color copying. This is the main feature of the invention. It is determined whether the original has a colored background or not, and if it does not have, a background elimination process is carried out.

Criteria on the determination are as follows.

(1b) Single-Colored Background

In the case of a single-colored background of, e.g. Y (yellow), a peak of Y (yellow) alone of the background has a high density. In this case, there is a great difference in density between the peak of Y and peaks of other colors. Thus, the single-colored background is determined.

(2b) Colored Background other than a Single-Colored Background

In the case of a background including all three colors C, M and Y (e.g. gray), there is no great difference among peak positions of the three colors, and all peaks have high densities. Thus, if the peaks have predetermined levels or more, the colored background is determined.

(3b) Peak Area of Colored Background

Where the colored background is determined in above (2b), if the position of the colored background is exactly determined, the areas of the three colors C, M and Y up to the peaks are substantially equal.

Subsequently, the background process presence/absence determination means 154 determines whether the background process is to be executed or not, on the basis of the original type discrimination result and colored background determination result.

In the meantime, when the original is to be scanned (pre-scan, main scan), a full-color mode or a black mode is set as the color mode through the operation panel 40.

Where the full-color mode is set as the color mode:

The background process is performed if the absence of colored background has been determined by the colored background determination and the character original has been determined as the original type.

Where the black mode is set as the color mode:

The background process is performed only when the character original has been determined as the original type.

When the background process presence/absence determination means 154 has determined the presence of the background process, the CPU 155 generates the background process table.

Figure 6:
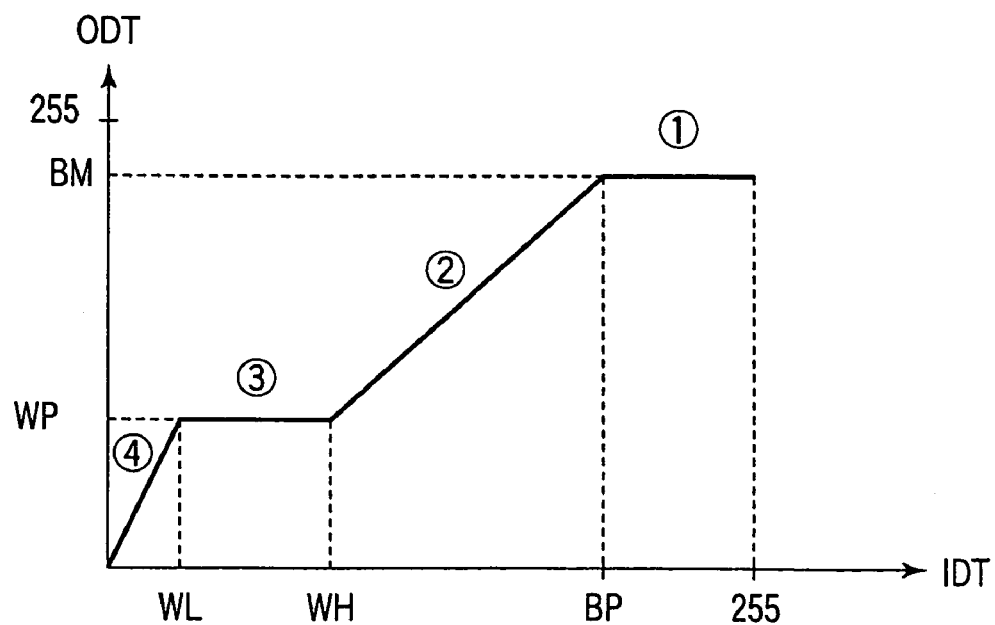
FIG. 6 is a view for explaining a background processing table.

FIG. 6 shows an example of the background process table. In FIG. 6, IDT denotes input data; ODT a calculation result; WL a background lower limit reference value (fixed value); WP a background peak output (fixed value); WH a minimum background elimination value calculated from density histograms of three color signals C, M and Y; BP a black (character) side reference value (fixed value); and BM a black-side upper limit value (fixed value).

Respective blocks calculated by the CPU 155 are represented by the following formulae.

Block ①: Where the input data IDT is equal to or greater than the black-side reference value BP, the calculation result ODT is the black-side upper limit value BM.

$$BP \leq IDT$$

$$\Rightarrow ODT = BM$$

Block ②: Where the input data IDT is equal to or greater than the background elimination value WH and is less than the black-side reference value BP, the calculation result ODT is expressed by formula, $$(BM-WP)/(BP-WH)\times(IDT-WH)+WP.$$

$$WH \leq IDT < BP$$

$$\Rightarrow ODT=(BM-WP)/(BP-WH)\times(IDT-WH)+WP$$

Block ③: Where the input data IDT is equal to or greater than the background lower limit reference value WL and is less than the background elimination value WH, the calculation result ODT is the background peak output WP.

$$WL \leq IDT < WH$$

$$\Rightarrow ODT=WP$$

Block ④: Where the input data IDT is less than the background lower limit reference value WL, the calculation result ODT is expressed by WP/WL×IDT.

$$IDT<WL$$

$$\Rightarrow ODT=WP/WL \times IDT$$

The CPU 55 generates the background process table by calculations based on the above formulae, and sets the generated table in the density adjustment means 156.

Subsequently, based on the set density adjustment table or background process table, the density adjustment means 156 of image processing section 132 performs density adjustment of each of the color signals C, M and Y input by main scan from the color conversion section 131 and outputs the corresponding density adjustment signals to the color printer section 2.

Where the background process table prepared by the CPU 155 is synthesized with the density adjustment table, the following operation is carried out.

When the background process is to be executed, the CPU 155 sets a new density adjustment table in the density adjustment means 156, which is formed by synthesizing the prepared background process table and the density adjustment table selected in accordance with the original mode.

When the background process is not performed, the CPU 155 sets in the density adjustment means 156 the density adjustment table selected in accordance with the original mode.

According to the above-described embodiment of the present invention, in the color image forming apparatus which effects color image formation by mixing a plurality of colors, the background density of an original with a colored background, such as a map, is retained, and a background of a character original, a back-side image of which may be seen through, can be removed in the main processing. In addition, a background of a character original, which background may become conspicuous by copying and may overlap characters on the top side in a so-called "background overlap" phenomenon, can be removed.

What is claimed is:

1. An image processing apparatus for processing a plurality of color image signals input by reading of a color image on an original, the apparatus comprising:
   conversion means for converting said plurality of color image signals to a plurality of color signals;
   first producing means for producing density distributions of plural color signals on the basis of the plurality of color signals converted by the conversion means;
   discrimination means for discriminating a type of the original on the basis of the density distributions of the plural color signals produced by the first producing means;
   first determination means for determining a colored background on the basis of the density distributions of the plural color signals produced by the first producing means;
   second determination means for determining whether a background process is to be executed or not, on the basis of a determination result of the first determination means and a discrimination result of the discrimination means;

second producing means for producing, when the second determination means has determined that the background process is to be executed, a background process table using the density distribution values of the plural color signals produced by the first producing means; and density adjustment means for performing density adjustment of the plural color signals input from the conversion means, on the basis of the background process table produced by the second producing means, wherein said conversion means, said discrimination means, said first determination means and said second determination means are operated in pre-scan, and said conversion means and said density adjustment means are operated in main scan.

2. An image processing apparatus for processing a plurality of color image signals input by reading of a color image on an original, the apparatus comprising:

conversion means for converting said plurality of color image signals to a plurality of color signals;

first producing means for producing density distributions of plural color signals on the basis of the plurality of color signals converted by the conversion means;

discrimination means for discriminating a type of the original on the basis of the density distributions of the plural color signals produced by the first producing means;

first determination means for determining a colored background on the basis of the density distributions of the plural color signals produced by the first producing means;

second determination means for determining whether a background process is to be executed or not, on the basis of a determination result of the first determination means and a discrimination result of the discrimination means;

second producing means for producing, when the second determination means has determined that the background process is to be executed, a background process table using the density distribution values of the plural color signals produced by the first producing means; and density adjustment means for performing density adjustment of the plural color signals input from the conversion means, on the basis of the background process table produced by the second producing means, wherein said original is a character original or a photograph original, and said discrimination means discriminates an original type.

3. An image processing apparatus for processing a plurality of color image signals input by reading of a color image on an original, the apparatus comprising:

conversion means for converting said plurality of color image signals to a plurality of color signals;

first producing means for producing density distributions of plural color signals on the basis of the plurality of color signals converted by the conversion means;

discrimination means for discriminating a type of the original on the basis of the density distributions of the plural color signals produced by the first producing means;

first determination means for determining a colored background on the basis of the density distributions of the plural color signals produced by the first producing means;

second determination means for determining whether a background process is to be executed or not, on the basis of a determination result of the first determination means and a discrimination result of the discrimination means;

second producing means for producing, when the second determination means has determined that the background process is to be executed, a background process table using the density distribution values of the plural color signals produced by the first producing means; and density adjustment means for performing density adjustment of the plural color signals input from the conversion means, on the basis of the background process table produced by the second producing means.

wherein said processing means produces the background process table using a minimum background elimination value calculated from the density distribution values of the color signals.

4. An image processing apparatus to process a plurality of color image signals input by reading of a color image on an original, the apparatus comprising:

a color converter to convert said plurality of color image signals to a plurality of color signals;

a discrimination unit to discriminate a type of the original;

a first determination unit to determine whether a background has a color on the original;

a second determination unit to determine whether a color background process is to be executed or not, on the basis of a determination result of the first determination unit and a discrimination result of the discrimination unit;

a processor to produce a background process table on the basis of the plurality of color signals converted by the conversion means; and a density adjustment unit to perform density adjustment of the plural color signals input from the color converter, on the basis of the background process table produced by the processor, when the second determination unit has determined that the color background process is to be executed.

5. An image processing method for processing a plurality of color image signals input by reading of a color image on an original, the method comprising:

converting said plurality of color image signals to a plurality of color signals;

producing density distributions of plural color signals on the basis of the plurality of color signals converted by the converting step;

discriminating a type of the original on the basis of the density distributions of the plural color signals produced by the producing density distributions step;

determining a colored background on the basis of the density distributions of the plural color signals produced by the producing density distributions step;

determining whether a background process is to be executed or not, on the basis of a determination result of the determining a colored background step and a discrimination result of the discriminating step;

producing, when the determining whether a background process is to be executed or not step has determined that the background process is to be executed, a background process table using the density distribution values of the plural color signals produced by the producing density distributions step; and performing density adjustment of the plural color signals input from the converting step, on the basis of the background process table produced by the producing a background process table step, wherein the converting step, the discriminating step, the determining a colored background step and the determining whether a background process is to be executed or not step are operated in pre-scan, and the converting step and the density adjustment step are operated in main scan.

6. An image processing method for processing a plurality of color image signals input by reading of a color image on an original, the method comprising:

converting said plurality of color image signals to a plurality of color signals;

producing density distributions of plural color signals on the basis of the plurality of color signals converted by the converting step;

discriminating a type of the original on the basis of the density distributions of the plural color signals produced by the producing density distributions step;

determining a colored background on the basis of the density distributions of the plural color signals produced by the producing density distributions step;

determining whether a background process is to be executed or not, on the basis of a determination result of the determining a colored background step and a discrimination result of the discriminating step;

producing, when the determining whether a background process is to be executed or not step has determined that the background process is to be executed, a background process table using the density distribution values of the plural color signals produced by the producing density distributions step; and performing density adjustment of the plural color signals input from the converting step, on the basis of the background process table produced by the producing a background process table step, wherein the original is a character original or a photograph original, and the discriminating step discriminates an original type.

7. An image processing method for processing a plurality of color image signals input by reading of a color image on an original, the method comprising:

converting said plurality of color image signals to a plurality of color signals;

producing density distributions of plural color signals on the basis of the plurality of color signals converted by the converting step;

discriminating a type of the original on the basis of the density distributions of the plural color signals produced by the producing density distributions step;

determining a colored background on the basis of the density distributions of the plural color signals produced by the producing density distributions step;

determining whether a background process is to be executed or not, on the basis of a determination result of the determining a colored background step and a discrimination result of the discriminating step;

producing, when the determining whether a background process is to be executed or not step has determined that the background process is to be executed, a background process table using the density distribution values of the plural color signals produced by the producing density distributions step; and performing density adjustment of the plural color signals input from the converting step, on the basis of the background process table produced by the producing a background process table step, wherein the producing a background process step produces the background process table using a minimum background elimination value calculated from the density distribution values of the color signals.

8. An image processing method to process a plurality of color image signals input by reading of a color image on an original, the method comprising:

converting said plurality of color image signals to a plurality of color signals;

discriminating a type of the original;

determining whether a background has a color on the original;

determining whether a color background process is to be executed or not, on the basis of a determination result of the determining whether a background has a color step and a discrimination result of the discriminating step;

producing a background process table on the basis of the plurality of color signals converted by the converting step; and performing density adjustment of the plural color signals, on the basis of the background process table produced by the producing step, when the determining whether a color background process is to be executed or not step has determined that the color background process is to be executed.

9. An image processing apparatus for processing a plurality of color image signals input by reading of a color image on an original, the apparatus comprising:

a conversion unit configured to convert said plurality of color image signals to a plurality of color signals;

a first producing unit configured to produce density distributions of plural color signals on the basis of the plurality of color signals converted by the conversion unit;

a discrimination unit configured to discriminate a type of the original on the basis of the density distributions of the plural color signals produced by the first producing unit;

a first determination unit configured to determine a colored background on the basis of the density distributions of the plural color signals produced by the first producing unit;

a second determination unit configured to determine whether a background process is to be executed or not, on the basis of a determination result of the first determination unit and a discrimination result of the discrimination unit;

a second producing unit configured to produce, when the second determination unit has determined that the background process is to be executed, a background process table using the density distribution values of the plural color signals produced by the first producing unit; and a density adjustment unit configured to perform density adjustment of the plural color signals input from the conversion unit, on the basis of the background process table produced by the second producing unit, wherein said conversion unit, said discrimination unit, said first determination unit and said second determination unit are operated in pre-scan, and said conversion unit and said density adjustment unit are operated in main scan.

10. An image processing apparatus for processing a plurality of color image signals input by reading of a color image on an original, the apparatus comprising:
- a conversion unit configured to convert said plurality of color image signals to a plurality of color signals;
- a first producing unit configured to produce density distributions of plural color signals on the basis of the plurality of color signals converted by the conversion unit;
- a discrimination unit configured to discriminate a type of the original on the basis of the density distributions of the plural color signals produced by the first producing unit;
- a first determination unit configured to determine a colored background on the basis of the density distributions of the plural color signals produced by the first producing unit;
- a second determination unit configured to determine whether a background process is to be executed or not, on the basis of a determination result of the first determination unit and a discrimination result of the discrimination unit;
- a second producing unit configured to produce, when the second determination unit has determined that the background process is to be executed, a background process table using the density distribution values of the plural color signals produced by the first producing unit; and
- a density adjustment unit configured to perform density adjustment of the plural color signals input from the conversion unit, on the basis of the background process table produced by the second producing unit,
- wherein said original is a character original or a photograph original, and said discrimination unit discriminates an original type.

11. An image processing apparatus for processing a plurality of color image signals input by reading of a color image on an original, the apparatus comprising:
- a conversion unit configured to convert said plurality of color image signals to a plurality of color signals;
- a first producing unit configured to produce density distributions of plural color signals on the basis of the plurality of color signals converted by the conversion unit;
- a discrimination unit configured to discriminate a type of the original on the basis of the density distributions of the plural color signals produced by the first producing unit;
- a first determination unit configured to determine a colored background on the basis of the density distributions of the plural color signals produced by the first producing unit;
- a second determination unit configured to determine whether a background process is to be executed or not, on the basis of a determination result of the first determination unit and a discrimination result of the discrimination unit;
- a second producing unit configured to produce, when the second determination unit has determined that the background process is to be executed, a background process table using the density distribution values of the plural color signals produced by the first producing unit; and
- a density adjustment unit configured to perform density adjustment of the plural color signals input from the conversion unit, on the basis of the background process table produced by the second producing unit,
- wherein said processing unit produces the background process table using a minimum background elimination value calculated from the density distribution values of the color signals.

* * * * *